Oct. 17, 1950   J. VAN GELDER   2,526,306
BRACE AND ADJUSTER FOR REARVIEW MIRRORS
Filed Nov. 14, 1947

INVENTOR.
John Van Gelder
BY
McMorrow, Berman + Davidson
Attorneys

Patented Oct. 17, 1950

2,526,306

UNITED STATES PATENT OFFICE 2,526,306

BRACE AND ADJUSTER FOR REARVIEW MIRRORS

John Van Gelder, Oklahoma City, Okla.

Application November 14, 1947, Serial No. 786,033

3 Claims. (Cl. 248—279)

My invention relates to rear-view mirrors of the type which are supported by arms laterally of a motor vehicle so as to be adjustable in at least vertical directions, and more particularly to rear-view mirrors of this type as are carried by trucks, wherein the mirror-supporting arm is relatively long to position the mirror laterally outwardly of the truck body.

Such relatively long supporting arms are frequently connected to the truck by a universal bracket which includes means for swinging the arm horizontally and vertically. Such brackets provide threaded means for holding the arm and mirror in adjusted positions, but the relatively great vibration incident to truck operation usually causes such threaded means to loosen. Also, when a truck is to be parked closely adjacent to another truck or to a building, it is customary to swing the arm and mirror upwardly to a substantially vertically-disposed retracted position to protect the mirror against being broken. This operation requires the loosening of the universal joint and/or the threaded tightening means, and requires, therefore, readjustment of the mirror and arm when the truck again takes to the road. Also, the vibration aforesaid tends to cause failure of the arm in the region of the bracket. Finally, the slip stream generated while the truck is in motion tends to swing the elongated mirror and mirror arm rearwardly alongside of the truck, whereby to require frequent adjustments of the same while the truck is on the road.

With the foregoing in view, an object of my invention is to provide an improved brace and adjusting means for the supporting arms of rear-view mirrors.

A further object is to provide an improved brace and adjusting means for the supporting arms of rear-view mirrors which will not be loosened by vibration incident to truck operation and which will permit the mirror and supporting arm to be swung to an inoperative position without necessitating the loosening of joint-tightening means, but which will automatically limit return movement of the mirror and arm to a previously-selected adjusted position for operation of the truck.

Other objects and advantages reside in the particular structure of the invention, combination and arrangement of the several parts thereof, and in the particular mode of operation, all of which will be readily understood by those skilled in the art upon reference to the attached drawings in connection with the following specification, wherein the invention is shown, described and claimed.

Figure 1:
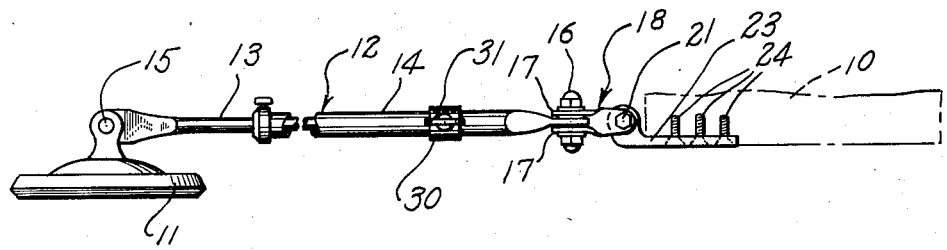
Figure 1 is a plan view of a rear-view mirror and supporting arm showing a preferred form of the invention applied thereto.

Referring specifically to the drawings, wherein like reference characters have been used throughout to designate like parts, 10 designates diagrammatically the door frame or like part of a motor vehicle, such as a truck cab. A rear-view mirror 11 is mounted on a supporting arm 12 which may comprise a rod section 13 telescopically disposed within a tubular section 14. The forward end of the rod section 13 is pivotally connected, as at 15, to the mirror 11 and the inner end of the tubular section 14 is pivoted between the vertical ears 17 of a bracket 18. A known form of supporting bracket 18 comprises the integral web 19 having a pair of forwardly-directed vertical ears 17 and an integral rearwardly-directed pair of horizontal ears 20. The ears 17 are axially apertured for passage of any suitable pin or bolt 16 therethrough, whereby the inner end of the tubular section 14 of the supporting arm is pivoted thereto. The horizontal ears 20 are also axially apertured for the passage therethrough of a suitable pin or bolt 21 by which the bracket is hingedly connected to the bight 22 of a hinge leaf 23. The hinge leaf 23 is detachably connected to the vehicle body portion 10 in any suitable manner, as by the machine screws or bolts 24. The foregoing structure is conventional and forms no part of my invention.

Obviously, from the foregoing the mirror arm 12 is swingable vertically by virtue of the pivotal connection 18 between the inner end and the vertical ears 17. At the same time, the bracket 18 is swingable horizontally on the pin or bolt 21. Obviously, to maintain the mirror arm 12 adjusted, both the bolts 16 and 21 are tightened. In like manner, to vary the adjustment, at least one of such bolts 16 and 21 must be loosened and retightened after the arm is adjusted.

Figure 2:
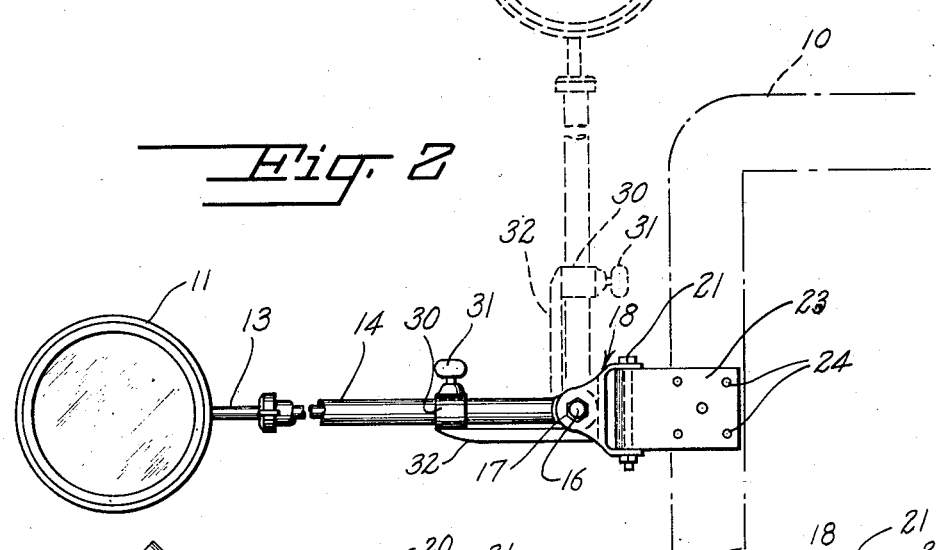
Figure 2 is a rear elevation of the device of Figure 1.
Figures 3, 4:
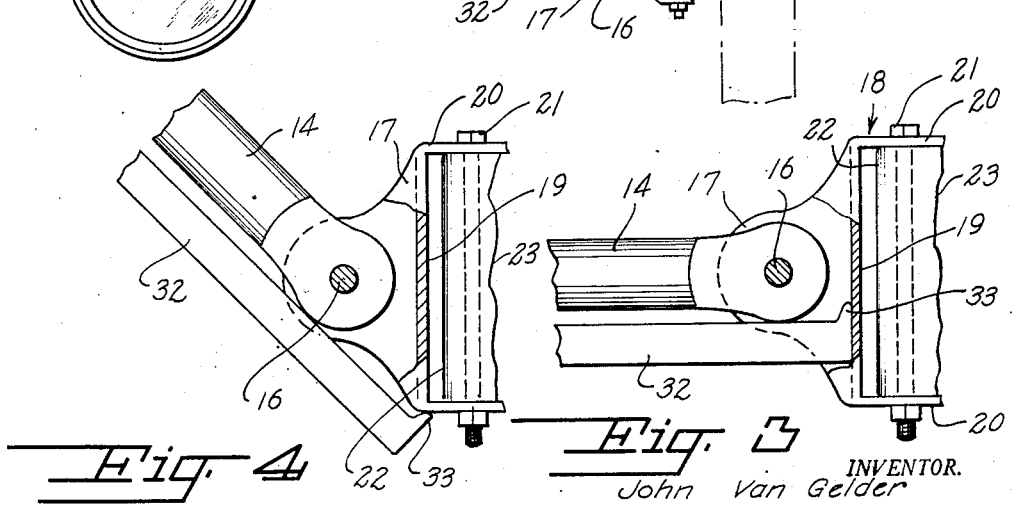
Figure 3 is an enlarged fragmentary elevation of the right-hand portion of Figure 2, showing one adjusted position of the mirror arm.
Figure 4 is a view like Figure 3, but showing a further adjusted position of the mirror-supporting arm.

A brace member is provided for the inner end of the section 14 of the supporting arm 12, and may comprise a tubular member 30 concentrically disposed about such section 14 and adjustably slidable thereon. Any suitable means, such as the thumb screw 31, may be utilized to locate the member 30 in a selected adjusted position. A rigidly-connected, rigid extension 32 extends inwardly from the member 30 toward the bracket 18. The free end of the brace 32 is preferably formed with an upwardly-directed hook portion 33, Figures 3 and 4. I have found that in use the elongated supporting arms 12 vibrate substantially and frequently break in the region adjacent the bracket 18. Thus, when the tubular member 30 and brace 32 are in the position of Figure 2, wherein the free end of the brace 32 abuts the outer surface of the web 19 of the bracket, vibration of the arm section 14 between the member 30 and the bracket 18 is materially reduced, whereby the longevity of the supporting arm is increased. At the same time, the free end of the brace 32, by virtue of its abutment with the web 19, provides a stop which limits downward movement of the arm to a horizontal, fully-extended position. The arm is free to be moved to the broken line position, Figure 2, when it is desired to retract the mirror while the vehicle is parked. No tightening of the bolt 16 is required to carry out this operation. Some drivers may desire to have the mirror arm positioned upwardly from the horizontal at some point intermediate the fully-extended position and the vertically-retracted position. Figure 4 illustrates the use of the brace 32 to accomplish this purpose. In Figure 4, the brace has been moved inwardly along the arm section 14 until the free hooked end 33 extends inwardly beyond the web 19. Now, when the arm is swung downwardly from the retracted position, the toe of the hook 33 engages the under surface of the lowermost horizontal ear 20 and limits downward movement of the arm to a position satisfactory to the driver. Thus, when, after such adjustment, the driver is forced to again move the arm 14 to its vertically-retracted position, no further adjustment is needed when he takes the truck once more on the road, as the toe of the brace 33 will again engage in the proper position to position the mirror and arm at its desired angular relation. At the same time, the brace 32 still functions as a brace and reinforces the arm 12 in the region of the bracket 18.

While I have shown and described what is now thought to be the preferred embodiment of my invention, it is to be understood that the same is susceptible of other forms and expressions. Consequently, I do not limit myself to the precise structure as shown and described hereinabove, except as hereinafter claimed.

I claim:

1. In a rear-view mirror for a motor vehicle, having a bracket mounted on said vehicle, a mirror arm, and means hingedly connecting the inner end of said arm to said bracket whereby said arm is swingable vertically to and from a substantially horizontal fully-extended position and a substantially vertically-retracted position; a collar encircling said arm and adjustably slidable thereon, a rigid brace integral with said collar and extending therefrom inwardly along said arm in subjacent relation thereto, said brace terminating in a free end, said free end being adjustably engageable with selected portions of said bracket to limit downward movement of said arm from said retracted position to a selected extended position, said brace simultaneously reinforcing that portion of said arm between said collar and bracket, and means for locking said collar and brace in adjusted positions relative to said arm and bracket.

2. In a rear-view mirror for a motor vehicle, having a bracket mounted on said vehicle, a mirror arm, and means hingedly connecting the inner end of said arm to said bracket whereby said arm is swingable vertically to and from a substantially horizontal fully-extended position and a substantially vertically-retracted position; means mounted on said arm and movable toward and away from said inner end thereof, a rigid brace rigidly connected to said means and extending therefrom inwardly along said arm in subjacent relation thereto, said brace terminating in a free end, said free end being adjustably engageable with selected portions of said bracket to limit downward movement of said arm from said retracted position to a selected extended position, said brace simultaneously reinforcing that portion of said arm between said last-named means and bracket, and means for locking said last-named means and brace in adjusted positions relative to said arm and bracket.

3. In a rear-view mirror for a motor vehicle, having a bracket mounted on said vehicle, a mirror arm, and means hingedly connecting the inner end of said arm to said bracket whereby said arm is swingable vertically to and from a substantially horizontal fully-extended position and a substantially vertically retracted position; a collar encircling said arm and adjustably slidable thereon, a rigid brace integral with said collar and extending therefrom inwardly along said arm in subjacent relation thereto, said brace terminating in a free end, said free end being formed with an upwardly-directed hook, said hook being adjustably engageable with selected portions of said bracket to limit downward movement of said arm from said retracted position to a selected extended position, said brace simultaneously reinforcing that portion of said arm between said collar and bracket, and means for locking said collar and brace in adjusted positions relative to said arm and bracket.

JOHN VAN GELDER.

REFERENCES CITED

The following references are of record in the file of this patent:

UNITED STATES PATENTS

| Number | Name | Date |
| --- | --- | --- |
| 1,201,789 | Aldworth | Oct. 17, 1916 |
| 2,353,588 | Ritz-Woller | July 11, 1944 |
| 2,393,056 | Noblitt et al. | Jan. 15, 1946 |